United States Patent Office 3,770,727
Patented Nov. 6, 1973

3,770,727
NOVEL BASIC PYRAZOLINE DYES
Alfred Brack, Leverkusen, Germany, assignor to Bayer Aktiengesellschaft, Leverkusen, Germany
No Drawing. Filed Aug. 31, 1970, Ser. No. 68,485
Claims priority, application Germany, Sept. 5, 1969,
P 19 45 053.4; July 23, 1970, P 20 36 505.3
Int. Cl. C09b 23/00
U.S. Cl. 260—240.8  9 Claims

ABSTRACT OF THE DISCLOSURE

Basic dyestuffs of the general formula

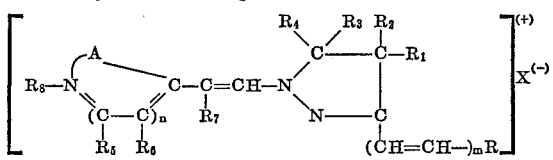

in which A denotes the residual members of a heterocyclic 5- or 6-ring with which further rings may be fused; R means an aryl radical or a heterocyclic radical of aromatic character; $R_1$, $R_2$, $R_3$, $R_4$, $R_5$ and $R_6$, independently of one another, denote hydrogen or a non-ionic radical, preferably alkyl, cycloalkyl, aralkyl, or aryl radicals, and $R_1$ may be linked to $R_2$ or $R_3$ or R; $R_7$ means hydrogen or a nitrile group; $R_8$ is an alkyl, cycloalkyl, aralkyl or aryl radical, and $R_8$ may also be linked to any ring fused with A; $X^{(-)}$ means an anion; and $m$ and $n$, independently of one another denote the numbers 0 or 1; and in which the carbocyclic and heterocyclic radicals and the acyclic hydrocarbon radicals contained in these formulae may carry nonionic substituents, as well as processes for the production thereof, and their use for dyeing and printing.

---

The present invention relates to new basic dyes of the general formula

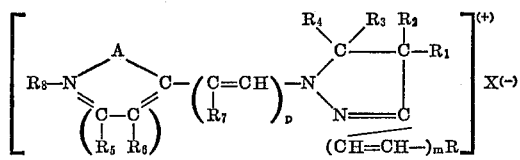

in which A represents the radicals of a 5- or 6-member heterocyclic ring to which other rings can be fused, R is an aryl radical or an aromatic heterocyclic radical, $R_1$, $R_2$, $R_3$, $R_4$, $R_5$ and $R_6$ independently of each other being hydrogen or a non-ionic radical, advantageously alkyl, cycloalkyl, aralkyl or aryl radicals, $R_7$ is hydrogen or a nitrile group and $R_8$ is hydrogen, an alkyl, cycloalkyl, aralkyl or aryl radical, on the condition that if $p$ indicates the number 1, $R_8$ cannot stand for hydrogen, $X^{(-)}$ is an anion and $m$, $n$ and $p$ independently represent the numbers 0 or 1, and wherein the radicals R to $R_4$ on the one hand and $R_5$, $R_6$ and $R_8$ on the other can be interconnected with formation of one or more ring systems, and $R_8$ can be connected to a ring fused on A, and wherein the carbocyclic and heterocyclic rings and the acyclic radicals may contain the usual non-ionic substituents used in the chemistry of cationic dyes, as well as to the process of their manufacture and their use as materials for dyeing and printing of natural and synthetic materials.

Conventional non-ionic substituents that are suitable in the chemistry of basic dyes are for example alkyl, hydroxy-, alkyloxy-, aryloxy, acyloxy, acyl, alkoxycarbonyl-, amidocarbonyl-, nitrile-, nitro-, amino-, acylamino-, alkylamino-, dialkylamino-, sulfonyl-, mercapto, alkylmercapto- and arylmercapto groups as well as halogen atoms such as fluorine, chlorine and bromine.

Suitable alkyl radicals are e.g. methyl, ethyl, n-propyl, isopropyl, n-butyl, iso-butyl, n-amyl, iso-amyl, neo-pentyl, allyl and their products of substitution such as beta cyanethyl, beta chloroethyl, beta methoxyethyl, beta ethoxyethyl, beta ethoxycarbonylethyl.

The cyclohexyl radical is especially important among the cycloalkyl radicals, and of the aralkyl radicals the benzyl, beta phenylethyl, gamma phenylpropyl and phenylpropyl-(2,2) radicals are especially important.

Suitable aryl radicals are e.g. phenyl, 2-, 3- and 4-methylphenyl, 2-, 3- and 4-ethylphenyl, 4-isopropylphenyl, 4-tert.-butylphenyl, 4 - cyclohexyphenyl, 4-bisphenylyl, phenyl-4,5-tetramethylene, 2-, 3- and 4-chlorophenyl, 2,4-dichlorophenyl, 2-, 3- and 4-bromophenyl, 4-fluorophenyl, 4-trifluorophenyl, 4-acetylphenyl, 4 - cyanophenyl, 4-methoxycarbonylphenyl, 4-ethoxycarbonylphenyl, 4-methylsulfonylaminophenyl, 3-methylsulfonylphenyl, 2-, 3- and 4-methoxyphenyl, 2-, 3- and 4-ethoxyphenyl, 4-isopropoxyphenyl, 4-methylmercaptophenyl, and naphthyl-1.

Suitable heterocyclic radicals are e.g. thienyl-2, furyl-2, pyridyl-2, benzoxazolyl-2 and benzthiazolyl-2.

As anionic radicals $X^{(-)}$ the usual organic and inorganic anions for basic dyes are involved, e.g. there may be mentioned: chloride⁻, bromide⁻, $CH_3SO_4^-$, $C_2H_5SO_4^-$, p-toluene sulfonate, $HSO_4^-$, $SO_4^{--}$, benzene sulfonate, p-chlorobenzene sulfonate, dihydrogen phosphate, phosphate, acetate, chloracetate, formiate, propionate, lactate, crotonate, $NO_3^-$, perchlorate, $ZnCl_3$ and the anions of saturated or unsaturated aliphatic dicarboxylic acids such as malonic acid, maleic acid, citric acid, oxalic acid, itaconic acid, succinic acid, glutaric acid, adipic acid, pimelic acid and suberic acid. Advantageously colorless anions are preferred for dyeing from aqueous media that do not affect the water solubility of the dye too much. For dyeing from organic solvents such anions are often used that promote the solubility of the dye in organic solvents or at least do not affect the solubility in a negative way.

Dyes of the formula

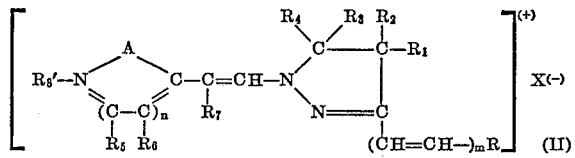

were prepared, in that compounds of Formula III are condensed with heterocyclic aldehydes of Formula IV or functional derivatives thereof in an acid medium that releases an anion $X^{(-)}$ or with addition of a condensation medium that forms an anion $X^{(-)}$:

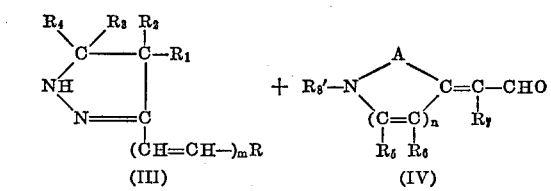

In Formulas II, III and IV A indicates the radicals of a heterocyclic 5- or 6-member ring which can be fused to the remaining rings, R is an aryl radical or a heterocyclic aromatic radical, $R_1$, $R_2$, $R_3$, $R_4$, $R_5$ and $R_6$ independently of each other are hydrogen or a non-ionic radical, advantageously alky-l, cycloalkyl-, aralkyl, or aryl radicals, whereby $R_1$ and/or $R_2$ can be bound to $R_3$ and/or $R_4$ or R, $R_7$ is hydrogen or a nitrile group, $R_8'$ is alkyl, cycloalkyl, aralkyl or aryl, $R_8'$ can also be bound to a ring fused at A and whereby $R_5$, $R_6$ and $R_8'$ can be interconnected with formation of one or more ring system, $X^{(-)}$ stands for an anion and $m$ and $n$ independently of each other signifying the number 0 to 1. The carbocyclic and heterocyclic radicals and the acyclic hydrocarbon radicals contained in these formulas can contain non-ionic substituents.

For carrying out the process that is claimed, suitable compounds of Formula III are for example 3-phenyl pyrazoline (Δ2),
3-(4'-methylphenyl)-pyrazoline-(Δ2),
3-(2'-ethylphenyl-pyrazoline-(Δ2),
3-(4'-isopropylphenol)-pyrazoline-(Δ2),
3-(4-tertiary butylphenyl)-pyrazoline-(Δ2),
3-(4'-cyclohexylphenyl)-pyrazoline-(Δ2),
3-(4'-biphenylyl)-pyrazoline-(Δ2),
3-(4'-chlorphenyl)-pyrazoline-(Δ2),
3-(3'-chlorphenyl)-pyrazoline-(Δ2),
3-(2'-chloropenyl)-pyrazoline-(Δ2),
3-(2',4'-dichlorphenyl)-pyrazoline-(Δ2),
3-(3',4'-dichlorphenyl)-pyrazoline-(Δ2),
3-(4'-bromophenyl)-pyrazoline-(Δ2),
3-(4'-fluorophenyl)-pyrazoline-(Δ2),
3-(4'-trifluoromethyl)-pyrazoline-(Δ2),
3-(4'-acetylphenyl)-pyrazoline-(Δ2),
3-(4'-cyanophenyl)-pyrazoline-(Δ2),
3-(4'-methoxycarbonylphenyl)-pyrazoline-(Δ2),
3-(4'-ethoxycarbonylphenyl)-pyrazoline-(Δ2),
3-(4'-methylsulfonylphenyl)-pyrazoline-(Δ2),
3-(4'-methylsulfonylaminophenyl)-pyrazoline-(Δ2),
3-(4'-methoxyphenyl)-pyrazoline-(Δ2),
3-(4'-ethoxyphenyl)-pyrazoline-(Δ2),
3-(4'-phenoxyphenyl)-pyrazoline-(Δ2),
3-(4'-isopropoxyphenyl)-pyrazoline-(Δ2),
3-styryl-5-phenylpyrazoline-(Δ2),
3-(p-chlorostyryl)-5-(4'-chlorophenyl)-pyrazoline-(Δ2),
3-(o,p-dichlorostyryl)-5-(2',4'-dichlorophenyl)-pyrazoline-(Δ2),
3-(2'-thienyl)-pyrazoline-(Δ2),
3-(5'-methylthienyl-2')-pyrazoline-(Δ2),
3-(2'-furyl)-pyrazoline-(Δ2),
3-[5'-(o,p-dichlorophenylfuryl-2')]-pyrazoline-(Δ2),
3-(4'-pyridyl)-pyrazoline-(Δ2),
3-(2'-benzoxazolyl)-pyrazoline-(Δ2),
3-(2'-benzthiazolyl)-pyrazoline-(Δ2),
3-(1'-naphthyl)-pyrazoline-(Δ2),
3-(2'-naphthyl)-pyrazoline-(Δ2),
3-phenyl-4,5-tetramethylenepyrazoline-(Δ2),
3,4-diphenylpyrazoline-(Δ2),
3,5-diphenylpyrazoline-(Δ2)

and the pyrazoline derivative of formula

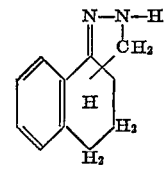

Suitable compounds of Formula IV are the indoline-ω-aldehydes tabulated in Table 1, the benz-(c,d)-indole-ω-aldehydes of Table 2, the quinoxalone-ω-aldehydes of Table 3, the quinazolone-ω-aldehydes of Table 4, 3-methyl- and (3-ethyl-) 2-methylene-dihydro-(2,3-benzthiazolo-ω-aldehyde, 3 - ethyl-2-formylmethylene-4,5-benzodihydro-(2,3)-benzthiazole, 3,4-dimethyl-2-formylmethylenedihydro-(2,3)thiazole, 3-methyl-2-formylmethylene-dihydro - (2,3) - benzoxazole, 1,6-dimethyl-2-formylmethylene-dihydro-(1,2)-quinoline and 1-methyl-4-formylmethylene-dihydro-(1,4)-quinoline. Suitable functional derivatives of compounds (IV) are for example acetal, nitrone, azomethine, enamine and salts thereof such as anilinovinyl compounds and the primary products of the Vilsmeier aldehyde synthesis, as well as the corresponding geminal dihalogen compounds.

TABLE 1

| $R_7$ | $R_8'$ | 4 | 5 | 6 | 7 |
|---|---|---|---|---|---|
| Hydrogen | Methyl | Hydrogen | Hydrogen | Hydrogen | Hydrogen. |
| Cyano | do | do | do | do | Do. |
| Do | do | do | Methoxy | do | Do. |
| Do | do | do | Ethoxy | do | Do. |
| Hydrogen | Ethyl | do | Hydrogen | do | Do. |
| Do | Phenyl | do | do | do | Do. |
| Do | Benzyl | do | do | do | Do. |
| Do | Methyl | Methyl | do | do | Do. |
| Do | do | Hydrogen | Methyl | do | Do. |
| Do | do | do | Hydrogen | Methyl | Do. |
| Do | do | do | do | Hydrogen | Methyl. |
| Do | do | do | do | do | Ethyl. |
| Do | do | do | Methoxy | do | Hydrogen. |
| Do | do | do | Ethoxy | do | Do. |
| Do | do | do | Trifluoromethyl | do | Do. |
| Do | do | do | Fluoro | do | Do. |
| Do | do | do | Chloro | do | Do. |
| Do | do | do | do | do | Chloro. |
| Do | do | do | do | do | Methoxy. |
| Do | do | do | Methylsulphonylamino. | do | Do. |
| Do | do | do | Dimethylamino | do | Do. |
| Do | do | Methoxycarbonyl | Hydrogen | do | Do. |
| Do | do | Hydrogen | Cyano | do | Do. |
| Do | do | do | Methoxycarbonyl | do | Do. |
| Do | do | do | Acetyl | do | Do. |
| Do | do | do | Phenyl | do | Do. |
| Do | do | do | do | do | Phenyl. |
| Do | do | do | Cyclohexyl | do | Hydrogen. |
| Do | do | do | Hydrogen | Methoxycarbonyl | Do. |
| Do | do | Chloro | do | Chloro | Do. |
| Do | do | Methoxy | do | Methoxy | Do. |
| Do | Ethyl | 4,5-benzo | | Hydrogen | Do. |
| Do | Methyl | Hydrogen | 5,6-benzo | | Ethyl. |
| Do | do | do | Hydrogen | 6,7-benzo | |

TABLE 2

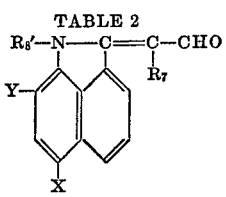

| R₇ | R₈' | x | y |
|---|---|---|---|
| Hydrogen | Methyl | Hydrogen | Hydrogen. |
| Do | Ethyl | do | Do. |
| Do | n-Propyl | do | Do. |
| Do | iso-Propyl | do | Do. |
| Do | n-Butyl | do | Do. |
| Do | iso-Butyl | do | Do. |
| Do | n-Amyl | do | Do. |
| Do | Cyclohexyl | do | Do. |
| Do | Benzyl | do | Do. |
| Do | β-Phenylethyl | do | Do. |
| Do | Phenyl | do | Do. |
| Cyano | Ethyl | do | Do. |
| Do | do | Methoxy | Do. |
| Hydrogen | do | do | Do. |
| Do | do | Chloro | Do. |
| Do | do | do | Chloro. |
| Do | do | Bromo | Hydrogen. |
| Do | do | do | Bromo. |
| Do | Methyl | Hydrogen | Ethyl. |
| Do | Ethyl | Dimethylamino | Hydrogen. |

TABLE 3

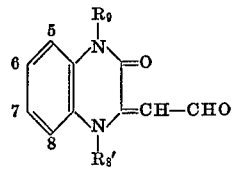

| R₈' | R₉ | 5 | 6 | 7 | 8 |
|---|---|---|---|---|---|
| Methyl | Methyl | Hydrogen | Hydrogen | Hydrogen | Hydrogen. |
| Do | Ethyl | do | do | do | Do. |
| Do | n-Propyl | do | do | do | Do. |
| Do | iso-propyl | do | do | do | Do. |
| Do | n-Butyl | do | do | do | Do. |
| Do | iso-Butyl | do | do | do | Do. |
| Do | n-Hexyl | do | do | do | Do. |
| Do | Benzyl | do | do | do | Do. |
| Do | β-Phenylethyl | do | do | do | Do. |
| Do | Cyclohexyl | do | do | do | Do. |
| Do | Phenyl | do | do | do | Do. |
| Ethyl | Methyl | do | do | do | Do. |
| Do | Phenyl | do | do | do | Do. |
| Methyl | Methyl | Methyl | do | do | Do. |
| Do | do | Hydrogen | Methyl | do | Do. |
| Do | do | do | Hydrogen | Methyl | Do. |
| Do | do | do | do | Hydrogen | Methyl. |
| Do | do | do | Methoxy | do | Hydrogen. |
| Do | do | do | Ethoxy | do | Do. |
| Do | do | do | Chloro | do | Do. |

TABLE 4

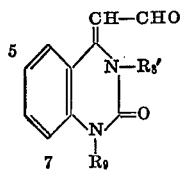

| R₈' | R₉ | 5 | 7 |
|---|---|---|---|
| Methyl | Hydrogen | Hydrogen | Hydrogen. |
| Ethyl | do | do | Do. |
| Phenyl | do | do | Do. |
| Methyl | Methyl | do | Do. |
| n-Butyl | do | do | Do. |
| Cyclohexyl | do | do | Do. |
| Benzyl | do | do | Do. |
| β-Phenylethyl | do | do | Do. |
| Methoxycarbonylmethyl | Hydrogen | do | Do. |
| π-Chlorophenyl | Methyl | do | Do. |
| Methyl | do | Methyl | Do. |
| Do | do | Hydrogen | Methyl. |
| Do | do | Methyl | Do. |
| Do | do | Methoxy | Hydrogen. |
| Do | do | do | Methoxy. |
| Do | do | Hydrogen | iso-Propyl. |
| Do | Methyl | Chloro | Hydrogen. |
| Do | do | Bromo | Do. |
| Do | do | Acetyl | Do. |
| Do | Hydrogen | Dimethylamino | Do. |

As acid medium anhydrous or aqueous organic and inorganic acids are suitable for the acid medium, e.g. acetic acid, formic acid, propionic acid, chloracetic acid, dichloracetic acid, trichloracetic acid, hydrochloric acid, sulfuric acid and phosphoric acid as well as mixtures of such acids. If an organic acid is used, it is possible though in general not necessary to add an acid anhydride, e.g. acetic acid anhydride, for acceleration of the condensation.

The condensation can also be conducted in inert organic solvents such as methylene chloride, chloroform, carbon tetrachloride, ethane tetrachloride, benzene, toluene or chlorobenzene with use of a condensation agent such as phosphoroxychloride, phosphortrichloride, phosphorpentachloride or thionyl chloride.

A preferred embodiment of the present invention consists in the heating of about equivalent amounts (III) and (IV) in glacial acetic acid to about 40° C. to the boiling temperature, advantageously to 75–105° C. The separation of the dye that is produced occurs in the usual way, e.g. by diluting with water and salting out with NaCl.

Preferred dyes of Formula II are those of Formulas V and VI:

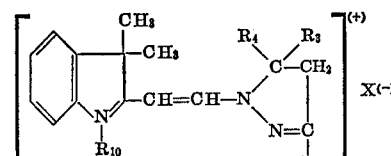

(V)

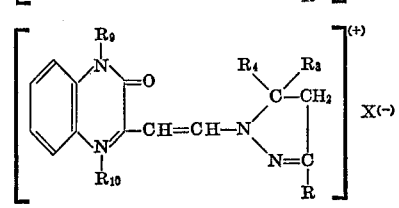

(VI)

in which R, R₃, R₄ and X⁽⁻⁾ have the indicated meaning, R₉ is an alkyl-, cycloalkyl-, aralkyl- or aryl radical and R₁₀ stands for a lower alkyl radical, and wherein the carbocyclic and heterocyclic radicals may contain nonionic substituents.

Dyes of the formula

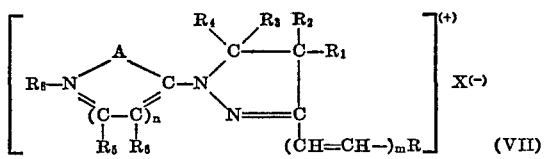
(VII)

wherein A, R, $R_1$, $R_2$, $R_3$, $R_4$, $R_5$, $R_6$, $R_8$, $X^{(-)}$, $m$ and $n$ have the meaning indicated in Formula I, can be prepared if compounds of formula

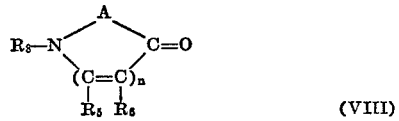
(VIII)

in which A, $R_5$, $R_6$, $R_8$ and $n$ have the above indicated meaning, or compounds of formula

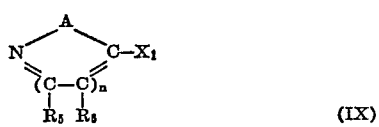
(IX)

in which A, $R_5$, $R_6$ and $n$ have the above meaning and $X_1$ is an anionic radical that can be split off, or compounds of the formula

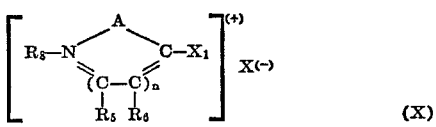
(X)

in which A, $R_5$, $R_6$, $R_8$ and $n$ have the above indicated meaning, $X_1$ is an anionic radical that can be split off, and $X^{(-)}$ is an anion, or their prior stages with addition of a condensation medium that produces an anion $X^{(-)}$ with pyrazolines of the formula

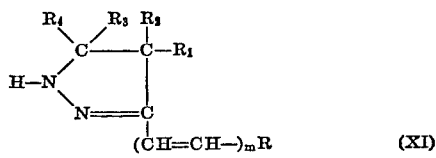
(XI)

in which R, $R_1$, $R_2$, $R_3$, $R_4$ and $m$ have the above indicated meaning, are reacted and—in case $R_8$ stands for hydrogen—possibly an alkyl, cycloalkyl, or aralkyl radical is introduced subsequently. In the reaction of compounds of Formula IX with Formula XI and the possible introduction of alkyl, cycolalkyl, or aralkyl radicals, dyes are produced corresponding to Formula I wherein $R_8$ is hydrogen, an alkyl, cycloalky, or aralkyl radical.

Compounds of Formula VIII which are suitable for the reaction of the invention are for example naphtholactam-(1,8),
4-chlor-naphtholactam-(1,8),
4-bromonaphtholactam-(1,8),
5-chlor-naphtholactam-(1,8),
5-bromonaphtholactam-(1,8),
2,4-dichlor-naphtholactam-(1,8),
2,4-dibrom-naphtholactam-(1,8),
2,4,5-trichlor-naphtholactam-(1,8),
4-methoxy-naphtholactam-(1,8),
4-ethoxy-naphtholactam-(1,8),
2-methyl-naphtholactam-(1,8),
2-ethyl-naphtholactam-(1,8),
6-hydroxy-naphtholactam-(1,8),
N-methyl-naphtholactam-(1,8),
N-ethyl-naphtholactam-(1,8),
N-n-propyl-naphtholactam-(1,8),
N-isopropyl-naphtholactam-(1,8),
N-n-butyl naphtholactam-(1,8),
N-isoamyl naphtholactam-(1,8),
N-n-hexyl naphtholactam-(1,8),
N-cyclohexyl naphtholactam-(1,8),
N-benzyl-naphtholactam-(1,8),
N-beta-phenylethyl naphtholactam-(1,8),
N-gamma-phenyl-n-propylnaphtholactam-(1,8),
N-phenyl naphtholactam-(1,8),
N-methoxycarbonylmethyl-naphtholactam-(1,8),
N-beta-cyanethyl naphtholactam-(1,8),
N-beta-chlorethylnaphtholactam-(1,8),
N-beta-ethoxycarbonylethyl naphtholactam-(1,8),
N-ω-methoxyethyl naphtholactam-(1,8),
N-beta-dimethylamino ethyl naphtholactam-(1,8),
N-beta-morpholinoethyl naphtholactam-(1,8),
N-methyl-4-chlor-naphtholactam-(1,8),
N-ethyl-4-bromonaphtholactam-(1,8),
N-ethyl-4-hydroxynaphtholactam-(1,8),
N-ethyl-4-methoxy naphtholactam-(1,8),
N-ethyl-4-n-butoxynaphtholactam-(1,8),
N-ethyl-4-dimethylamino naphtholactam-(1,8),
N-ethyl-4-nitronaphtholactam-(1,8),
N-ethyl-4-acetyl naphtholactam-(1,8),
N-ethyl-4-methyl-naphtholactam-(1,8),
N-methyl-5-chloro naphtholactam-(1,8),
N-methyl-2-ethyl-naphtholactam-(1,8),
N-ethyl-2,4-dichlor naphtholactam-(1,8),
N-ethyl-2,4-dibrom naphtholactam-(1,8),
N-n-butyl-4-brom-naphtholactam-(1,8),
N-methyl-7-methoxy-naphtholactam-(1,8),
N-ethyl-4-beta-methoxy ethoxynaphtholactam-(1,8),
N,2-trimethylene naphtholactam-(1,8),
N,2-trimethylene 4-chloronaphtholactam-(1,8),
N,2-trimethylene-4-brom naphtholactam-(1,8), acridone, N-methyl-acridone, N-ethylacridone, N-n-propyl acridone, N-iso-propyl acridone, N-n-butylacridone, N-iso-butyl acridone, N-n-amyl acridone, N-isoamyl acridone, N-n-hexyl acridone, N-neopentyl acridone, N-phenylacridone, N-benzyl acridone, N-beta-phenylethylacridone, N-cyclohexyl acridone, N-allyl acridone, 1-chloro acridone, 2-chloroacridone, 2-chloroacridone, 4-chloroacridone, 1-bromacridone, 2-bromacridone, 3-bromacridone, 4-bromacridone, as well as their N-methyl and N-ethyl derivatives, 1-methoxy acridone, 2-methoxy acridone, 3-methoxy acridone, 4-methoxy acridone, 1-ethoxy acridone, 2-ethoxy acridone, 3-ethoxy acridone, 4-ethoxy acridone, 2-n-butoxy acridone, 2-phenoxy acridone, 2-methylmercapto acridone, 2-methylsulfonyl acridone, 2-dimethylamino acridone, 2-diethylamino acridone, 2-methylacridone, 4-methyl acridone, 2-ethyl acridone, 4-ethyl acridone, 4-isopropyl acridone, 3-hydroxy acridone, 1,4-dimethoxy acridone, 2,4-dimethoxy acridone, 2,7-dimethoxy acridone, 2,7-diethoxy acridone, 2-methoxy-7-chloroacridone, N,4-trimethylene acridone, N-beta-cyanethyl acridone, N-beta-chlorethyl acridone, N-beta-methoxyethyl acridone, N-beta-ethoxyethyl acridone, N-beta-ethoxycarbonyl acridone, N-methoxycarbonylmethyl acridone and N-beta dimethylaminoethyl acridone, anthrapyridone (Formula XII), N-methyl anthrapyridone, N-n-butyl anthrapyridone, N-beta-ethoxyethyl anthrapyridone, 2-methyl anthrapyridone, 6-methyl anthrapyridone, 4-dimethylamino anthrapyridone and 4-anilino anthrapyridone.

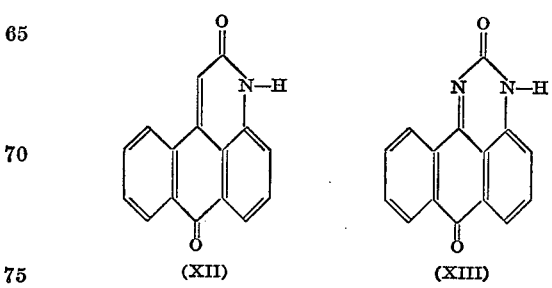

(XII)          (XIII)

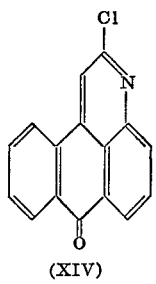 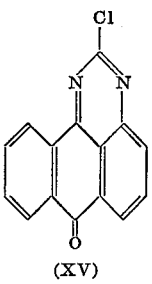

(XIV)  (XV)

anthrapyrimidone (Formula XIII), N-methyl- and N-ethyl anthrapyrimidone.

Suitable compounds of Formula IX are for example 2-methylmercaptobenz - (c,d) - indole, 2 - chlor-benz-(c,d)-indole, 9-chlor-acridine, 9-fluor-acridine, py-chlor anthrapyridine (Formula XIV) and py-chlor anthrapyrimidine (Formula XV) as well as 9-chloroacridine which is produced in the treatment of the diphenylamine-2-carboxylic acids of Table 5 in which $R_8$ is hydrogen, with phosphoroxychloride and/or phosphorpentachloride.

Suitable compounds of Formula X are for example the hydrochloric acid, sulfuric acid or acetic acid salts of the above mentioned compounds (IX) or their quaternary salts obtained with e.g. dimethylsulfate, diethylsulfate, toluene sulfonic acid methyl ester or benzyl chloride.

According to the invention suitable preliminary stages for the preparation of the compounds of Formulas VIII, IX, and X are diphenylamino-2-carboxylic acids of the formula

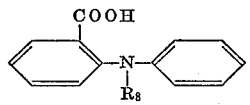

(XVI)

in which $R_8$ is hydrogen, an alkyl-, cycloalkyl-, aralkyl- or aryl radical, and the benzene nucleus may present substituents.

The designation "preliminary stage" does not mean however that the diphenylamine carboxylic acids are in any case first cyclized to acridine derivatives and only subsequently condensed with pyrazolines: the reaction steps can rather be transposed, i.e. first a compound of the formula

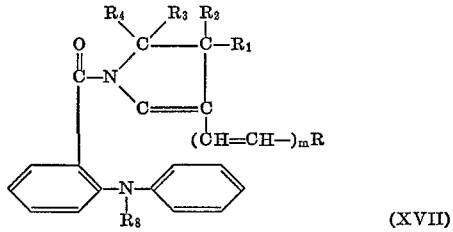

(XVII)

wherein R, $R_1$, $R_2$, $R_3$, $R_4$, $R_8$ and $m$ have the indicated meaning, is prepared, which by cyclizing with (formal) water slitting off (presumably in the course of at least one further intermediate stage) the dye is prepared.

Suitable compounds of Formula XVI are for example the diphenyl amino-2-carboxylic acids of the following table:

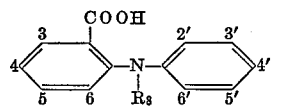

(XVIII)

TABLE 5

| $R_8$ | Substituent |
|---|---|
| Methyl | |
| Ethyl | |
| Benzyl | |
| Phenyl | |
| Methyl | 4'-methyl. |
| Do | 4'methoxy. |
| β-Cyanoethyl | |
| Do | 4'-ethoxy. |
| β-Chloroethyl | Do. |

TABLE 5—Continued

| $R_8$ | Substituent |
|---|---|
| β-Methoxyethyl | 4',5'-dimethoxy. |
| β-Dimethylaminoethyl | |
| Hydrogen | |
| Do | 3'-methyl. |
| Do | 4'-methyl. |
| Do | 6'-methyl. |
| Do | 3',4'-dimethyl. |
| Do | 4',6'-dimethyl. |
| Do | 4'-ethyl. |
| Do | 4'-iso-propyl. |
| Do | 4'-cyclohexyl. |
| Do | 4'-hydroxy. |
| Do | 4'-methoxy. |
| Do | 4'-ethoxy. |
| Do | 4'-n-propoxy. |
| Do | 4'-iso-propoxy. |
| Do | 4'-n-butoxy. |
| Do | 4'-iso-amyloxy. |
| Do | 4-ethoxy. |
| Do | 4,4'-diethoxy. |
| Do | 3',4'-diethoxy. |
| Do | 3',5'-diethoxy. |
| Do | 4',6'-diethoxy. |

| | Substituents or fused rings |
|---|---|
| Hydrogen | 4-chloro-4',6'-diethoxy. |
| Do | 4'-dimethylamino. |
| Do | 4'-diethylamino. |
| Do | 4-chloro-4'-diethylamino. |
| Do | 3,4-benzo. |
| Do | 3,4-benzo-4'-ethoxy. |
| Do | 2',3'-benzo. |
| Do | 3',4'-benzo. |
| Do | 4'-methoxycarbonyl. |
| Do | 3'-ethoxycarbonyl. |
| Do | 4'-acetyl. |
| Do | 4-chloro-4'-acetyl. |
| Do | 3',4'-dichloro. |
| Do | 3',4',4-trichloro. |
| Do | 4'-bromo. |
| Do | 4'-fluoro. |
| Do | 4'-methylsulfonylamino. |
| Do | 4'-dimethylamidocarbonylamino. |
| Do | 4'-methoxycarbonylamino. |
| Do | 4'-methylsulfonyl. |
| Do | 4'-trifluoromethyl. |
| Do | 3-methyl-4'-methoxy. |
| Do | 5-methoxy-4'-methyl. |
| Do | 6-methoxy-4'-ethoxy. |
| Do | 4,5-dichloro-4'-ethoxy. |

Further suitable compounds of Formula XVI are for example the compounds which present the following structure:

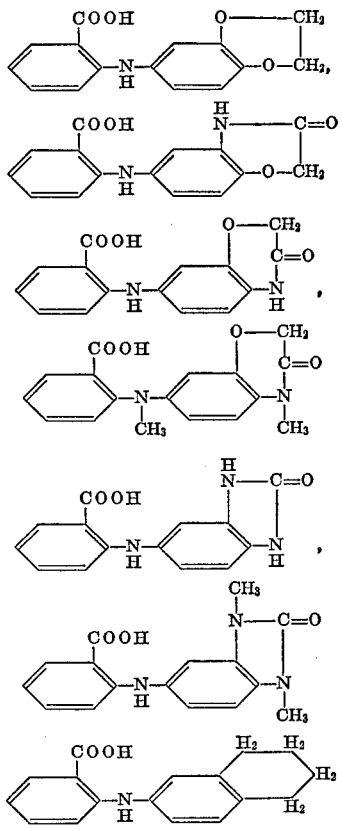

and

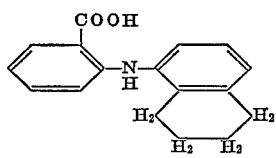

Suitable pyrazolines of Formula XI are described as those of Formula III in col. 2.

Of the dyes of the general Formula VII those of Formula XIX or XX are preferred:

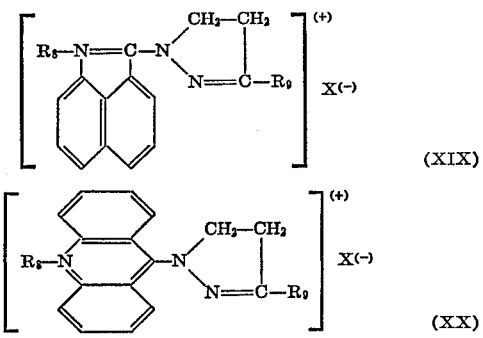

wherein $R_8$ and $X^{(-)}$ have the meaning indicated above, $R_9$ stands for an aryl radical or a thienyl radical and the rings and acyclic radicals may present the non-ionic substituents that are conventional in the chemistry of cationic dyes.

Dyes of Formula XIX can be prepared in that compounds of the formulas

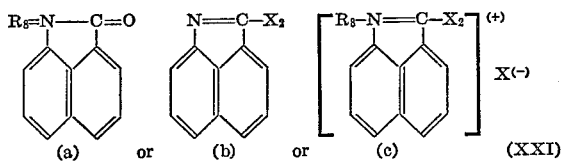

in which $R_8$ has the meaning indicated above and can be joined with the naphthalene ring, $X_2$ stands for a radical that can be split off anionically, especially a mercapto group or a halogen atom, $X^{(-)}$ is an anion, and wherein $R_8$ and the naphthalene ring may contain non-ionic substituents that are conventional in the chemistry of cationic dyes, are condensed with pyrazolines of the general formula

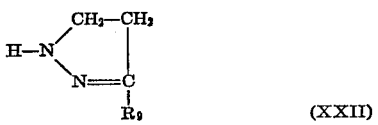

in which $R_9$ has the meaning indicated above, and in case $R_8$ stands for hydrogen an alkyl, cycloalkyl or aralkyl radical is introduced subsequently.

Dyes of Formula XX can be prepared when compounds of formulas

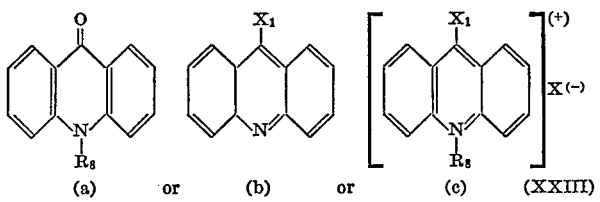

or their preliminary stages of Formula XVI wherein $R_8$ has the meaning indicated above, $X_1$ stands for a radical that can be split off anionically, $X^{(-)}$ is an anion, and wherein the acridine or acridone ring may contain non-ionic substituents that are customary in the chemistry of cationic dyes, are condensed with pyrazolines of the general formula

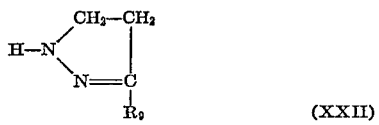

wherein $R_9$ has the meaning indicated above, and in case $R_8$ stands for hydrogen an alkyl, cycloalkyl or aralkyl radical is introduced subsequently.

If a starting product of Formula a is used for preparation of the dyes of Formula XIX or XX, it is necessary to effect the condensation with addition of a condensation agent that releases an anion $X^{(-)}$.

For carrying out the process of the invention a compound of Formula VIII or XVI for example is heated with an equivalent amount of a pyrazoline of Formula XI in an inert diluent with addition of a condensation agent that releases an anion $X^{(-)}$. One of the components may also be used in excess. As diluent there are advantageously those which comprise fluids that are inert with reference to the condensation medium which—possibly under vacuum—can be readily removed by distillation, e.g. methylene chloride, chloroform, carbon tetrachloride, ethane tetrachloride, ethylene trichloride, dichlorethane, chlorobenzene, dichlorobenzene, benzene, or toluene. As condensation medium acid chlorides such as phosphoroxychloride, phosphoroxybromide, phosphor-, tri- and pentachloride, thionylchloride and phosgene can be used. These condensation media can often be used also in such excess that they act also as solvents or diluents. This is especially true of phosphoroxychloride. The rate of condensation can be increased by supplementary use of other water-splitting agents such as aluminumchloride, titanium tetrachloride or phosphorpentoxide.

In a modification of the process, a compound for Formula IX or X is condensed with a pyrazoline of Formula XI or XXII. For these processes it is generally not necessary to add a condensation agent. Rather it is sufficient to heat compound IX or X in a suitable solvent with the pyrazoline. The optimal temperature depends upon the structure of the components and can very readily be determined empirically because the beginning of condensation is associated with a color effect: in general, heating up to about 160° C. will lead to the desired result. As solvent there may be used for example alcohols such as methanol, ethanol, n- and isopropanol, iso-amylalcohol, glycol, glycolmonomethylether and glycerol, ethers such as diethyleneglycol-dimethyl- and diethylether and dioxan, also pyridine, quinoline, dimethyl formamide, N-methyl-pyrrolidone, tetrachlorethane, chlorobenzene and o-dichlorobenzene. The water-soluble solvents with high boiling point are preferred because they allow an especially simple way of operating.

The type of anion $X^{(-)}$ is generally not important for the coloring properties, and it is given by the method of preparation and the possible purification of the crude dye. In general the dyes are present as halides (particularly as chlorides or bromides) or as methosulfates, ethosulfates, sulfates, benzenes or toluene sulfonates or as acetates. The anions can be exchanged in any way for other anions e.g. tetrafluorborate, phosphate, chlorozincate, nitrate, perchlorate, oxalate, propionate, formiate, citrate, tartrate, lactate or benzoiate ions.

In order to achieve solubility in media suited for dyeing from organic solvents, these anions can be exchanged for e.g. 2-ethylcaproic acid, lauric acid, oleic acid, linoleic acid, a mixture of aliphatic carboxylic acids with 15 to 19 carbon atoms (Versatic Acid 1519, Shell Company), a mixture of aliphatic carboxylic acids with 9 to 11 carbon atoms (Versatic Acid 911, Shell Company), cocoa fat acid first running, tetradecanoic acid, undecylenic acid, dimethyl propane acid, dimethyl acetic acid, carboxylic acids whose carbon chain is broken by heteroatoms, e.g. nonylphenoltetraethylene glycolether propionic acid, nonylphenol diethylene glycolether propionic acid, dodecyltetraethylene glycolether propionic acid, 3-(nonyloxy)-propionic acid, 3-(isotridecyloxy)-propionic acid, 3-(isotridecyloxy)-diethylene glycolether propionic acid, ether propionic acid of the alcohol mixture with 6 to 10 carbon atoms, nonylphenoxyacetic acid, aromatic carboxylic acids such as tert.-butyl benzoic acid, cycloaliphatic carboxylic acids such as hexahydrobenzoic acid, cyclohexene carboxylic acid, abietic acid and sulfonic acids such as tetrapropylene benzene sulfonic acid and dedecylbenzene sulfonic acid.

The new products are valuable dyes which can be used for the dyeing and printing of natural and synthetic materials, e.g. leather, mordanted cotton, cellulose, synthetic superpolyamides and superpolyurethanes as well as for the dyeing of lignin-containing fibers such as coco, jute and sisal. They are also suitable for the preparation of writing fluids, stamping dyes, ball pen pastes, and they can be utilized also in rubber printing.

They are particularly suitable for the dyeing from aqueous baths or from organic solvents and printing of filaments, strips, fabrics and knit goods of polyacrylonitrile or copolymers of acrylonitrile and other vinyl compounds such as vinyl chloride, vinylidene chloride, vinyl fluoride, vinyl acetate, vinyl pyridine, vinyl imidazole, vinyl alcohol, acrylic and methacrylic acid esters and amides, asymmetric dicyanoethylene, or linters, fibers, yarns, webs, fabrics and knit goods of acid modified aromatic polyesters as well as acid modified polyamid fibers. Acid modified aromatic polyesters are for example polycondensation products of sulfoterephthalic acid and ethylene glycol, i.e., sulfonic acid group containing polyethyleneglycol terephthalates (type, Dacron 64 of E. I. du Pont de Nemours and Company) as described in Belgian Pat. No. 549,179 and U.S. Pat. No. 2,893,816.

The dyeing can be effected from weakly acid baths whereby the material is advantageously introduced into the bath at 40 to 60° C. and then dyed at boiling temperature. Under pressure it is also possible to dye at temperatures above 100° C. Moreover, the dyes can be added to spinning solutions for the production of polyacrylonitrile containing yarns, or they can be applied to unstretched filaments.

The dyeing and printing—especially on the last named materials—is characterized by outstanding resistance, primarily to light, moisture, decatizing, sublimation, sweat, crocking, and in many cases it is characterized by the clarity of the color tone. The new dyes present desired reserve effects, i.e. selective dyeing so that such fibers as intermixed wool or polyester are not dyed.

For application of the dyes to the materials the known processes of dyeing and printing including dyeing from organic solvents (e.g. chlorated hydrocarbons) can be utilized.

The parts indicated in the examples are parts by weight.

EXAMPLE 1

73 parts 3-phenylpyrazoline-($\Delta 2$) and 100 parts 1,3,3-trimethyl-2-methyleneindoline-$\omega$-aldehyde are heated with 450 parts glacial acetic acid and 50 parts concentrated hydrochloric acid for about 1 hour at 80–90° C. Thereafter the material is cooled to about 50° C. and the mixture is diluted with 4000 to 8000 parts water. The finely divided dye that is first separated out is coarsely dispersed by addition of saline solution and it can then readily be sucked off. It corresponds to the formula

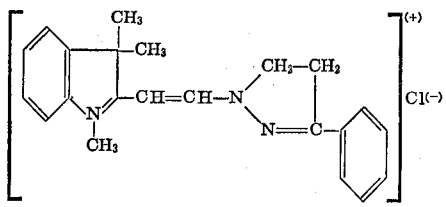

and is suitable for the dyeing, printing and bulk dyeing of polyacrylonitrile or acid modified polyesters in extraordinarily brilliant and very fast greenish yellow tones. The yield is almost quantitative.

If instead of the above mentioned aldehyde, equivalent amounts of one of the following aldehydes is used, very valuable yellow dyes of analogous structure are obtained with operating conditions otherwise unchanged: 5-methoxy-, 5-ethoxy, 5-benzyloxy-, 5-phenoxy-, 5-methyl, 5-ethyl, 5-benzyl-, 5-phenyl-, 5-chloro-, 5-fluoro-, 5-trifluoromethyl-, 5-methylsulfonyl-, 7-methyl-, 7-ethyl-, 7-methoxy-, 7-chloro-5,7-dichloro-, 5,7-dimethoxy-, 4,6-dimethyl-, 4,6-dichloro- and 4,7-dimethoxy-1,3,3-trimethyl-2-methylene-indoline-$\omega$-aldehyde, 1-ethyl-3,3-dimethyl-, 1-benzyl-3,3-dimethyl- and 1-phenyl-3,3-dimethyl-2-methylene-indoline-$\omega$-aldehyde. These aldehydes are prepared in the same way as the above mentioned aldehyde by Vilsmeir formylation of the corresponding 2-methyleneindoline.

EXAMPLE 2

100 parts 1,3,3-trimethyl-2-methylene-indoline-$\omega$-aldehyde and 88 parts 3-(4'-methoxyphenyl)-pyrazoline-($\Delta 2$) are heated to about 100° C. for 90 minutes with 500 parts glacial acetic acid. Workup as in Example 1. The yellow dye of formula

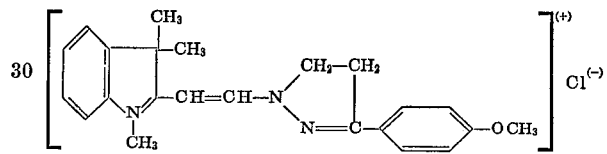

is obtained with very good yield. This dye has outstanding properties for the dyeing, printing and bulk dyeing of polyacrylonitrile and acid modified polyesters.

The 3 - (4'-methoxyphenyl)-pyrazoline-($\Delta 2$) was prepared by heating the Mannich base obtained from 4-methoxyacetophenone, paraformaldehyde and dimethylamine with an excess of hydrazine hydrate in methanol with addition of soda lye and purified by fractional distillation under vacuum (boiling point $_{0,8}$=160° C.). The structure was verified by analysis and mass spectroscopy. The following pyrazolines were similarly prepared which—if the process of Example 2 is applied with use of equivalent amounts of one of these pyrazolines—also yield very pure yellow dyes of corresponding structure:

3-(4'-ethoxyphenyl pyrazoline)-($\Delta 2$),
3-(4'-methylphenyl)-pyrazoline-($\Delta 2$),
3-(4'-ethylphenyl)-pyrazoline-($\Delta 2$),
3-(4'-biphenylyl)-pyrazoline-($\Delta 2$),
3-(3'-methoxyphenyl)-pyrazoline-($\Delta 2$),
3-(3',5'-dimethyl-phenyl)-pyrazoline-($\Delta 2$),
3-(4'-chlorphenyl)-pyrazoline-($\Delta 2$),
3-(3',4'-dichlorphenyl)-pyrazoline-($\Delta 2$),
3-(4'-bromphenyl)-pyrazoline-($\Delta 2$),
3-(4'-cyanphenyl)-pyrazoline-($\Delta 2$),
3-(4'-fluorphenyl)-pyrazoline-($\Delta 2$),
3-(4'-trifluormethylphenyl)-pyrazoline-($\Delta 2$),
3-(4'-methylsulfonylphenyl)-pyrazoline-($\Delta 2$),
3-(4'-methyl sulfonylaminophenyl)-pyrazoline-($\Delta 2$),
3-styryl-5-phenylpyrazoline-($\Delta 2$),
3-(4'-chlorstyryl)-5-(4'-chlorphenyl)-pyrazoline-($\Delta 2$) and
3-thienyl-(2'-)-pyrazoline-($\Delta 2$).

EXAMPLE 3

25.9 parts 1,3,3 - trimethyl-5-methoxycarbonyl-2-methylene indoline-$\omega$-aldehyde and 14.6 parts 3-phenylpyrazoline-($\Delta 2$) were heated in 150 to 200 parts chloroform with 15 to 20 parts phosphortrichloride or phosphoroxychloride for 30 to 40 minutes to boiling. After distilling off of the chloroform and recrystallization of the residue from water with addition of activated charcoal the dye of formula

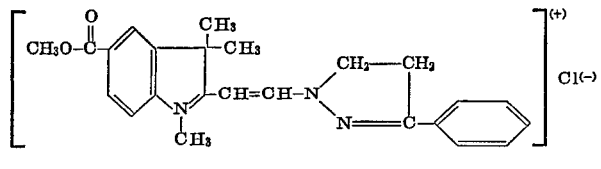

was obtained, which yields a very fast and clear yellow color or print on polyacrylonitrile and acid modified polyester.

EXAMPLE 4

19.1 parts 3-methyl-2-methylene-dihydro(2,3)-benzthiazole-ω-aldehyde and 14.6 parts 3-phenylpyrazoline-(Δ2) were heated in about 100 parts glacial acetic acid for 1 to 2 hours at about 90° C. After cooling to a temperature below 50° C. the dye solution was poured into 500 to 1000 parts water. After addition of about 50 parts NaCl the dye of formula

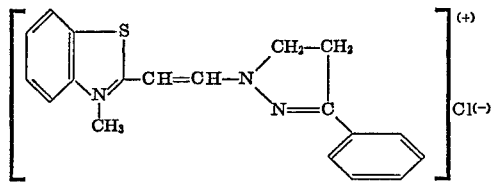

was sucked off. The yield in chromatographically pure dye was practically quantitative. The dye produces a yellow dye and print on the materials indicated.

If instead of 3-phenyl pyrazoline an equivalent amount of one of the pyrazolines listed in Example 2 is used, there is also a valuable yellow dye as product of an otherwise unchanged process.

EXAMPLE 5

17.5 parts 3-methyl-2-formylmethylene-dihydro (2,3)-benzoxazol (prepared according to Brooker, U.S. Pat. 2,165,692, Example 10) are condensed by the process of Example 4 with 14.6 parts 3-phenyl-pyrazoline-(Δ2). The dye of the formula

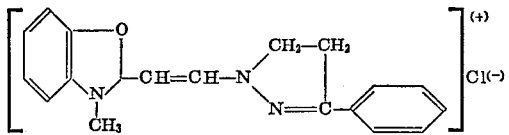

is obtained, which yields extraordinarily clear green-tinged yellow dyes and prints on polyacrylonitrile, acid modified polyester and acid modified polyamide.

If instead of 3-phenyl pyrazoline an equivalent amount of one of the pyrazolines listed in Example 2 is used, a valuable green-tinged yellow dye is obtained as product of an otherwise unchanged process.

EXAMPLE 6

7.6 parts 3-(2'-thienyl)-pyrazoline-(Δ2) and 11.0 parts of the aldehyde of formula

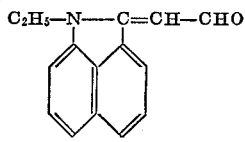

(prepared according to the indications of Example 1 of Belgian Pat. 647,036) are heated with 50 parts glacial acetic acid for 1 hour at about 90° C. Upon dilution of the cooled mixture with about 750 parts water there is obtained a deep red solution from which when about 50 parts saturated salt solution is added the dye of formula

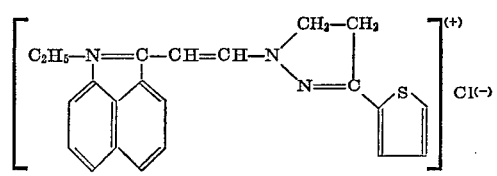

separates out with practically quantitative yield. Ruby red dyeing and prints are obtained on the specified materials, with good resistance properties.

If instead of 3-(2'-thienyl)-pyrazoline an equivalent amount of one of the pyrazolines listed in Example 2 is used, valuable red dyes are obtained by an otherwise unchanged process.

EXAMPLE 7

24.4 parts of the aldehyde of formula

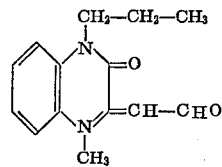

and 15.2 parts 3-(2'-thienyl)-pyrazoline-(Δ2) are heated with 100 to 150 parts glacial acetic acid for 1 to 2 hours at about 90° C. The mixture, cooled to about 50° C., is diluted with 1 to 2 liters water. After addition of NaCl solution the dye of formula

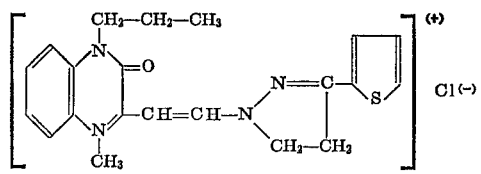

is separated out with very good yield. The dye when applied to the specified materials produces very fast brilliant orange dyes and prints.

The aldehyde that was used was prepared in the following manner: o-chlornitrobenzene was heated with an excess of n-propylamine with addition of copper powder in an autoclave for 5 hours at 170–180° C. (9–10 atm.). The nitropropylaniline was freed from the reaction product with soda lye. By vacuum distillation it was purified (boiling point $_{0.5}\approx 135°$ C.) and then converted to 2-amino-N-n-propylaniline by reduction with stannic-(II)-chloride in glacial acetic acid or by catalytic hydration (Raney nickel). The product was reacted in aqueous HCl solution at 60–70° C. with acetylcarboxylic acid. In this process an oil first separated out which solidified upon neutralizing of the cooled mixture with soda lye. The product thus obtained was purified by distillation (boiling point $_{0.5}$=145–147° C.). An oil was obtained which crystallized upon being rubbed with cyclohexan. The melting point is 51° C. Values on analysis correspond to the formula

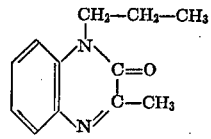

This compound was methylated by dropping from a heatable drop funnel into excess dimethylsulfate at 80–90° C.

From the salt thus obtained, by treatment with aqueous soda solution, the methylene base of the formula

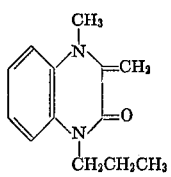

was prepared, which was purified by distillation (boiling point $_{0.4}$=149–151° C.). This methylene base was converted into the aldehyde of the above formula by Vilsmeier's process (by reaction with dimethylformamide and phosphoroxychloride in carbon tetrachloride at 50–60° C.). The aldehyde melts after crystallization from alcohol at 161–163° C.

The aldehydes listed in the specification, Table 3, can be similarly prepared. If the procedure of this example is followed with introduction of one of these aldehydes, a valuable orange dye is obtained by an otherwise unchanged process.

EXAMPLE 8

18.5 parts 1-methyl-4-formylmethylene-dihydro-(1,4)-quinoline (prepared as in Brooker, U.S. Pat. 2,165,692, Example 9) and 14.6 parts 3-phenyl-pyrazoline were heated with 100 parts glacial acetic acid for 45 minutes at about 90° C. From the cooled mixture, there is obtained by thinning with water and addition of NaCl the dye of formula

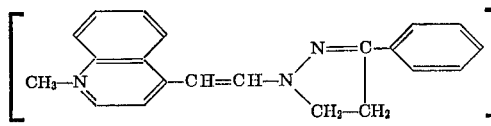

which yields orange dyes and prints on the specified materials.

If instead of 3-phenylpyrazoline an equivalent amount of one of the pyrazolines listed in Example 2 is used, a valuable orange dye is also obtained with no other change in the procedure.

EXAMPLE 9

19.7 parts N-ethyl-naphtholactam-(1,8) and 14.6 parts 3-phenyl pyrazoline-(Δ2) were dissolved in 60 parts chloroform. 20 parts phosphoroxychloride were allowed to run in, whereby the temperature rose to the boiling point of the solvent, and the mixture was kept boiling for another hour. The crude dye remaining after distilling off of the chloroform was dissolved in 700 parts boiling water and treated with activated charcoal. From the filtrate there separated upon cooling of the main mass the dye of formula

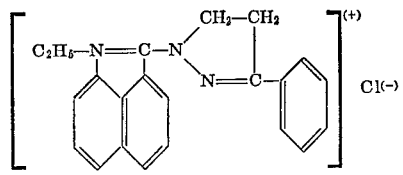

in crystalline form. The remainder was precipitated by addition of NaCl. The dye is suitable for the dyeing, printing and bulk dyeing of materials which consist entirely or preponderantly of polyacrylonitrile, in extraordinarily fast, very clear fluorescent yellow hues.

If instead of 3-phenyl-Δ2-pyrazoline, equivalent amounts are used of 3-4'-methylphenyl-, 3-4'-ethylphenyl-, 3-3'-methylphenyl-, 3-4'-methoxyphenyl, 3-4'-ethoxyphenyl-, 3-3',4'-dimethoxyphenyl, 3-4' - chlorphenyl, 3-4'-bromphenyl-, 3-4'-cyanphenyl- or 3-alpha-thienyl-Δ2-pyrazoline, with no other change in the process there are also obtained very pure yellow dyes.

EXAMPLE 10

169 parts naphtholactam-(1,8) and 146 parts 3-phenyl-pyrazoline-(Δ2) were stirred in 750 parts chlorobenzene with 150 parts phosphoroxychloride for 2½ hours at 80–100° C. Thereafter the residual condensation agent was decomposed by dropping in of water and the solvent was steam distilled off. There was thus obtained an aqueous dye solution. Upon cooling the dye of formula

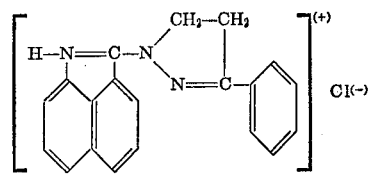

separated out in crystalline form. This dye was suitable for the dyeing of polyacrylonitrile, in very fast yellow tones.

The dye can be converted in the usual way, e.g. by stirring with dilute aqueous soda solution at about 50° C. into the dye base of formula

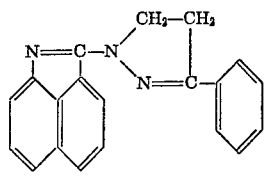

This compound melts after crystalization from methylcyclohexan or toluene at 186–188° C.

EXAMPLE 11

29.7 parts of the dye base of formula

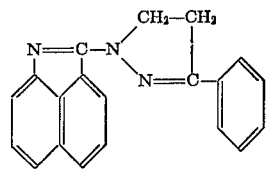

prepared as in Example 10 are dissolved in 50–100 parts dry dimethylformamide. At about 100° C. 13.0 parts acid free dimethylsulfate is allowed to run in, with stirring, and stirring is continued for another 1 to 3 hours at about 100° C. and the dye solution cooled to about 50° C. is diluted with 900 parts water. By addition of NaCl the dye of formula

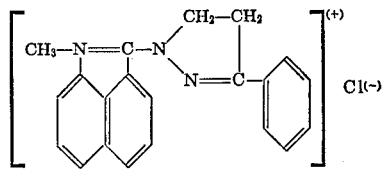

is separated out.

If instead of dimethylsulfate, equivalent amounts of diethylsulfate, ethylenechlorhydrin, beta-dimethylaminoethyl chloride, beta-diethylaminoethyl chloride, beta piperidinylethyl chloride, beta-morpholinoethyl chloride, beta-ethoxyethyl chloride, beta-chloro- or beta-brom-propionitrile or 1-iodobutane is used, a fast yellow dye is also obtained.

EXAMPLE 12

27.6 parts N-ethyl-4-brom-1,8-naphtholactam and 14.6 parts 3-phenyl-Δ2-pyrazoline are stirred with 100 parts freshly distilled phosphoroxychloride for 2 to 4 hours at 70 to 80° C. Thereafter the main amount of the phosphoroxychloride is distilled off under vacuum at a temperature below 80° C. The residue is first decomposed with 750 parts water and then boiled out. From the filtrate there separates the dye of formula:

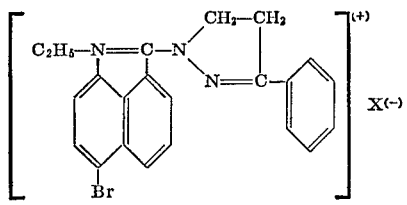

which dyes polyacrylonitrile with very good properties of resistance in very clear pronouncedly red-tinged yellow hues.

If instead of the above indicated naphtholactam derivative one of the following compounds is used in equivalent amount, pure coloristically similar dyes are obtained: N-methyl-4-brom-, N-n-propyl-4-brom-, N-isopropyl-4-brom-, N-n-butyl-4-brom-, N-isoamyl-4-brom-, N-n-hexyl-4-brom-, N-methyl-4-chloro-, N-ethyl-2,4-dichloro-, N-methyl-5-chloro-, N-methyl-2,4,5-trichloro-, N-methyl-5-brom-, N-ethyl-4-acetyl-, N-ethyl-4-acetylamino-, N-ethyl-4-methyl sulfonylamino-, N-ethyl-4-dimethylamino-, N-ethyl-4-methoxy-, N-methyl-6-methoxy- and N-methyl-6-methylaminonaphtholactam-(1,8).

EXAMPLE 13

209 parts N,2-trimethylene naphtholactam-(1,8) and 146 parts 3-phenyl-Δ2-pyrazoline were stirred with 750 parts freshly distilled phosphoroxychloride with addition of 70 to 150 parts phosphorpentoxide for 4 to 6 hours at about 60° C. Thereafter the cooled mixture was poured into 5000 parts water for decomposition of the excess condensation agent. After completion of the hydrolysis the separated dye of formula

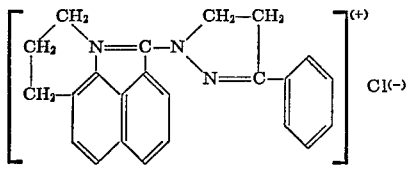

was purified by crystallization from water with addition of charcoal. The dye yields very fast bright green-tinged yellow dyes and prints on materials made of polyacrylonitrile.

If instead of the N,2-trimethylenenaphtholactam, equivalent amounts of 2-methyl-, 2-ethyl-, 2-isopropyl- or N-methyl-2-ethyl-naphtholactam (1,8) is used, with otherwise unchanged procedure very fast green-tinged yellow dyes are also obtained.

EXAMPLE 14

222 parts N-beta-cyanethyl-1,8-naphtholactam and 152 parts 3-alpha-thienyl-Δ2-pyrazoline are condensed in 750 parts chloroform with 150 to 200 parts phosphoroxychloride according to the method indicated in Example 9. The dye of formula

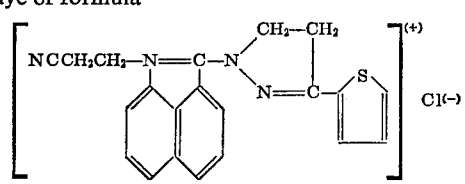

is obtained which yields very fast yellow dyes and prints on polyacrylonitrile.

If instead of the cyanethylnaphtholactam an equivalent amount is used of N-methoxycarbonylmethyl-, N-ethoxycarbonylmethyl-, N-beta-methoxycarbonylethyl-, N-beta-ethoxycarbonylethyl-, N-beta-dimethylaminoethyl, N-beta-diethylaminoethyl-, N-beta-ethoxyethyl-, N-benzyl-, N-4'-methoxybenzyl-, N-beta-phenylethyl-, N-phenyl-, N-4'-hydroxyphenyl- or N-4'-ethoxyphenyl-1,8-naphtholactam, with otherwise unchanged procedure, very fast yellow dyes are obtained.

EXAMPLE 15

32.5 parts of the salt of formula

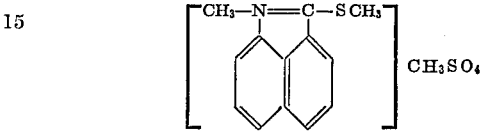

and 17.6 parts 3-4'-methoxyphenyl-Δ2-pyrazoline are heated in 100 parts dimethyl formamide until the completion of the splitting off of methylmercaptan at 100 to 110° C. After dilution with water the dye of formula

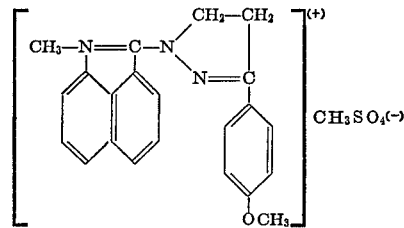

is separated in the usual way. It yields brilliant, very pure yellow dyeings and prints on polyacrylonitrile with good fastness properties.

EXAMPLE 16

22.5 parts N-n-butylnaphtholactam-(1,8) and 22.2 parts 3,5-diphenyl-Δ2-pyrazoline are condensed together as in the indications of Example 9. The dye of formula

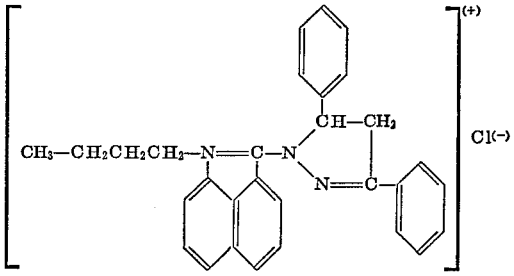

is obtained which is suited for the dyeing, bulk dyeing and printing of polyacrylonitrile, in very pure yellow tones. If instead of 3,5-diphenyl-Δ2-pyrazoline equivalent amounts of one of the following Δ2-pyrazolines is used, conforming to the general Formula XI, a very fast yellow dye is also obtained;

| R₃ | R₄ | R₂ | R₁ | R | m |
| --- | --- | --- | --- | --- | --- |
| Phenyl | Hydrogen | Hydrogen | Hydrogen | Phenyl | 1 |
| Hydrogen | do | Phenyl | do | do | 0 |
| Methyl | Methyl | Hydrogen | do | do | 0 |
| R₃+R₄= | Cyclohexyl | do | do | do | 0 |
| Hydrogen | Hydrogen | R₁+R₂= | Cyclohexyl | do | 0 |
| Do | R₄+R₂= | Cyclohexyl | Hydrogen | do | 0 |
| Do | Hydrogen | Methyl | Methyl | do | 0 |
| Do | do | Hydrogen | Hydrogen | p-Methoxyphenyl | 0 |
| Do | do | do | do | Alpha thienyl | 0 |

EXAMPLE 17

14.6 parts of 3-phenyl-Δ2-pyrazoline are added to a solution of 18.7 parts of naphthostyrylimide chloride (prepared according to the method of German Offenlegungsschrift 1,445,624, Example 1b) in 100 to 150 parts of anhydrous chlorobenzene. The mixture is slowly heated to about 120° C. and held at this temperature for about 20 minutes. Thereafter the solvent is distilled off with steam. The dyestuff of Example 10 is thus obtained.

EXAMPLE 18

193 parts N-methylacridone and 146 parts 3-phenyl-Δ2-pyrazoline are heated in 1000 parts o-dichlorobenzene with 250 parts phosphoroxychloride for 5 hours at about 120° C. Thereafter the mixture is allowed to cool, the excess phosphoroxychloride is decomposed by cautious addition of water and the o-dichlorobenzene is driven off with steam. From the aqueous solution thus obtained, the dye partly separates upon cooling. The separation is completed by addition of NaCl. The dye thus obtained, of formula

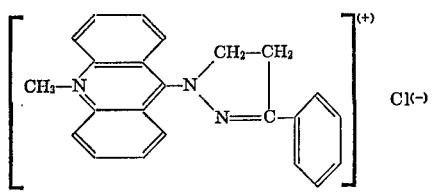

can be purified by crystallizing from water with addition of charcoal. The dye is suitable for dyeing, printing and bulk dyeing of materials that wholly or preponderantly comprise polyacrylonitrile or acid modified polyesters or acid modified polyamides, in outstandingly fast yellow hues.

If instead of 3-phenyl pyrazoline the equivalent amount of one of the pyrazolines listed in Example 9, last paragraph, very fast yellow dyes are also obtained.

EXAMPLE 19

239 parts 2-ethoxy-acridone and 146 parts 3-phenyl-Δ2-pyrazoline are condensed according to the indications of Example 18. A strong red-tinged yellow dye is obtained, of formula

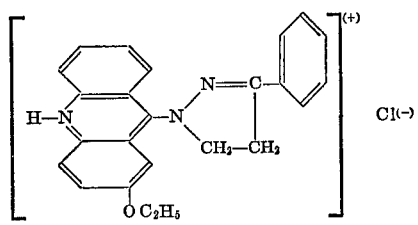

which yields very fast dyes and prints on the specified materials.

If instead of 2-ethoxy-acridone the equivalent amount of the acridones listed in the following table are used, corresponding dyes are obtained which yield very fast dyes and prints on polyacrylonitrile materials as indicated in the table.

| Acridone: | Color on polyacrylonitrile |
|---|---|
| 2-methoxy acridone | Red-tinged yellow. |
| 2-n-propoxy acridone | Do. |
| 2-n-butoxy acridone | Do. |
| 2-isobutoxy acridone | Do. |
| 2-benzyloxy acridone | Do. |
| 3-methoxy acridone | Do. |
| 4-phenoxy acridone | Yellow. |
| 2,7-dimethoxy acridone | Red-tinged yellow. |
| 1,4-diethoxy acridone | Orange. |
| 2,7-diethoxy acridone | Red-tinged orange. |
| 1,4-dimethoxy acridone | Orange. |
| 4,7-dimethoxy acridone | Do. |
| 1-chloroacridone | Red-tinged yellow. |
| 2-chloroacridone | Do. |
| 3-chloroacridone | Do. |
| 4-chloroacridone | Yellow. |

TABLE—Continued

| Acridone: | Color on polyacrylonitrile |
|---|---|
| 2-bromacridone | Red-tinged yellow. |
| 2,7-dichloroacridone | Do. |
| 2,7-dibromacridone | Do. |
| 2-methylacridone | Do. |
| 2-ethylacridone | Do. |
| 4-isopropylacridone | Yellow. |
| 3-phenylacridone | Red-tinged yellow. |
| 2-cyclohexylacridone | Do. |
| 2-dimethylaminoacridone | Violet. |
| 2-diethylaminoacridone | Do. |

EXAMPLE 20

213 parts diphenylamine-2-carboxylic acid is heated with 500 parts phosphoroxychloride for 1½ hours at about 100° C. Then at about 50° C. there is added portionwise 146 parts 3-phenylpyrazoline-(Δ2), and the mixture is stirred for another 2½ hours at about 50° C. and then with rapid agitation and thorough cooling it is allowed to run into 1000 parts water. A yellow suspension is obtained. After complete hydrolysis of the phosphoroxychloride the product is sucked off and washed with cold water. In very good yield, there is obtained the dye of formula

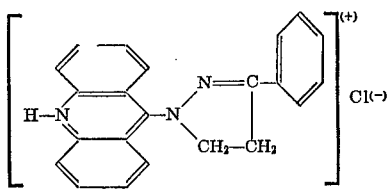

which can be purified by crystallization from water, but in general this is not necessary. The product is suitable for the dyeing of polyacrylonitrile in fast yellow hues. The dye can be converted by stirring with dilute soda solution into the dye base of formula

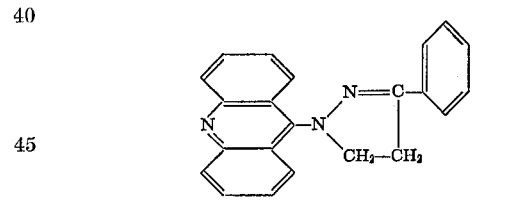

This compound can be crystallized from methylcyclohexan, for example, and it melts then at 158° C. By quaternizing this dye base with dimethylsulfate in toluene at 70 to 100° C. there is obtained the dye of Example 18 in the form of methosulfate. Fast yellow dyes are also obtained with diethylsulfate or another quaternizing agent listed in Example 11.

EXAMPLE 21

213.5 parts 9-chloroacridine and 176 parts 3-(4'-methoxyphenyl)-pyrazoline-(Δ2) are slowly heated to 120 to 130° C. with 750 parts chlorobenzene and held at this temperature for 2 to 3 hours. Thereafter the solvent is steam distilled off. The residue is stirred with excess lime solution or soda lye whereby the dye base of formula

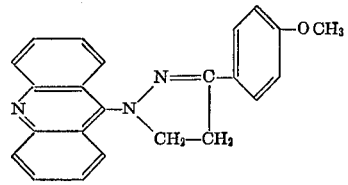

is liberated. This compound can be purified by crystallization from toluene. Orange red crystals are obtained, which melt at 210 to 214° C.

23

The salts of this compound with inorganic and organic acids such as hydrochloric acid, hydrobromic acid, sulfuric acid, methyl sulfuric acid, phosphoric acid, amidosulfonic acid, methansulfonic acid, benzene and paratoluene sulfonic acid, formic acid, acetic acid, lactic, acid, chloro-, di- and trichloroacetic acid, propionic acid, butyric and isobutyric acid as well as the quaternary salts, e.g. with the quaternizing agents of Example 11— are suitable for the dyeing, printing and bulk dyeing of the materials specified in various examples, in very fast red-tinged yellow hues.

EXAMPLE 22

257 parts 4'-ethoxyphenylamine-2-carboxylic acid and 400 to 500 parts phosphoroxychloride are heated to 90° C. for 2½ hours. Thereafter at 40 to 50° C. there is added 152 parts 3-(alpha-thienyl)-pyrazoline-(Δ2) and the mixture is stirred for another 2 hours at about 50° C. and the porduct is worked up as indicated in Example 20. The dye of formula

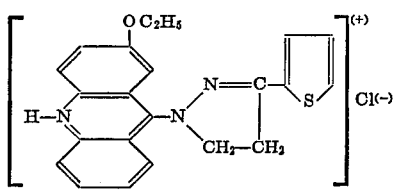

is obtained, which yields outstandingly fast orange-red color and prints on the materials mentioned in the previous examples.

If instead of 4'-ethoxydiphenylamine-2-carboxylic acid there is used an equivalent amount of 4'-methoxy-, 4'-n-propoxy-, 4'-isobutoxy-, 4'-phenoxy-, 3',4'-dimethoxy-, 2',4'-dimethoxy-, 2',5'-dimethoxy-, 2',5'-diethoxy-, 3',5'-diethoxy-, 4,4'-diethoxy-, 4-chloro-4'-ethoxy-, 4,4'-dichloro-4'-methyl-, 4'-ethyl-, 4'-phenyl-, 4'-cylohexyl- or 4'benzyldiphenylamine-2-carboxylic acid, fast orange red dyes are also obtained. If instead of thienyl pyrazoline the equivalent amount of 3-4'-methoxyphenyl-, 3-4'-ethoxyphenyl-, 3-4'-n-butoxyphenyl- or 3-4'-isoamyloxyphenyl-Δ2-pyrazoline is used, very fast dyes with an orange red tone are obtained. These dyes can be converted in the usual way into the basic color bases which can be quaternized with suitable alkylating agents. The quaternary salts thus obtained with the agents listed in Example 11 yield outstandingly fast dyes and prints on polyacrylonitrile.

EXAMPLE 23

A mixture of 13.0 parts N-methyl anthrapyridone, 7.3 parts 3-phenyl pyrazoline-(Δ2), 75 parts o-dichlorobenzene and 10 parts phosphoroxychloride is heated at about 120° C. for 5 hours. On cooling, the dye of formula

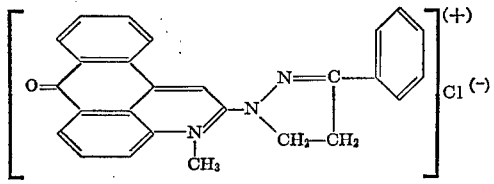

separates out in crystalline form. For purification it is sufficient to wash the crude product with a suitable solvent, e.g. benzene or ethylene chloride, but the dye can also be purified by crystallization from water. It dyes polyacrylonitrile with a good lightfast orange.

If instead of phenylpyrazoline an equivalent amount of 3-(alpha-thienyl)-pyrazoline-(Δ2), 3-(4'-methoxyphenyl)-pyrazoline-(Δ2), 3-(4'-ethoxyphenyl)-pyrazoline-(Δ2) or 3-(4'-diethylaminoethoxyphenyl)-pyrazoline-(Δ2) is used, with the same procedure, dyes are obtained which dye polyacrylonitrile with a very good lightfast orange.

24

EXAMPLE 24

A fabric of polyacrylonitrile is printed with a printing paste which is prepared in the following way: 30 parts by weight of the dye of formula

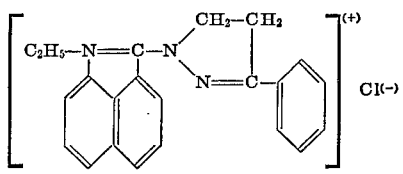

50 parts by weight thiodiethyleneglycol, 30 parts by weight cyclohexanol and 30 parts by weight 30% acetic acid have 330 parts by weight hot water poured over them and the obtained solution is added to 500 parts by weight crystal gum (gum arabic as thickener). Finally an additional 30 parts by weight zinc nitrate solution is added. The print is dried, steamed for 30 minutes and then rinsed. A yellow print with very good properties of resistance is obtained.

EXAMPLE 25

Acid modified polyglycolterephthalate fibers are placed in an aqueous bath at 20° C. with a bath ratio of 1:40, the bath containing per liter 3 to 10 g. sodium sulfate, 0.1 to 1 g. oleylpolyglycolether (50 moles ethylene oxide), 0 to 15 g. dimethylbenzyldodecylammonium chloride and 0.15 g. of the dye of formula

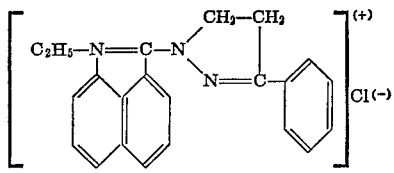

and adjusted to a pH of 4 to 5 with acetic acid. The mixture is heated in less than 30 minutes to 100° C. and the bath is held at this temperature for 1 hour. Finally the fibers are rinsed and dried. A yellow dye with very good properties of resistance is obtained.

EXAMPLE 26

Polyacrylonitrile fibers are placed in an aqueous bath at 40° C. with a bath ratio of 1:40, the bath containing per liter 0.75 g. 30% acetic acid, 0.38 g. sodium acetate and 0.15 g. of the dye of formula

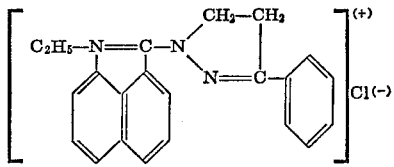

The bath is heated to boiling within 20 to 30 minutes and the bath is held at this temperature for 30 to 60 minutes. After rinsing and drying there is obtained a yellow dye with very good properties of resistance.

EXAMPLE 27

In a dye vessel of 500 ml. capacity which is in a heated water bath, 0.055 g. of the dye of formula

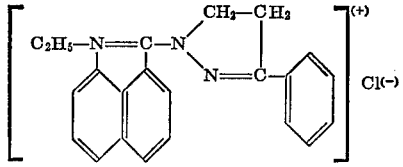

is pre-mixed with 20 times the quantity of hot water and some acetic acid and dissolved with hot water. The dye bath receives an addition of 0.5 g. of the product of 50 moles ethylene oxide on 1 mole oleyl alcohol and cold water is added to make up 500 ml. The pH of the dye bath is adjusted with acetic acid or sodium acetate to 4.5 to 5.

In this dye bath 10 g. piece goods made of acid modified polyamide are held in constant movement while the temperature is raised to 100° C. in the course of 15 minutes. Dyeing is effected at boiling temperature for 15 to 20 minutes, and the material is then rinsed with cold water and dried, e.g. by ironing or in the drying cabinet at 60 to 70° C.

A yellow dyed material is obtained.

What is claimed is:

1. Dye of the formula

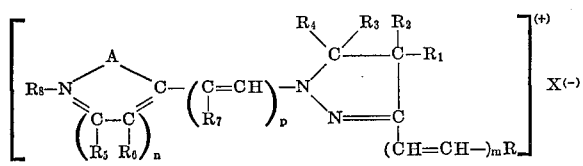

in which

A represents the remaining members necessary to form a 5- or 6-membered heterocyclic ring with

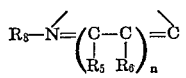

said heterocyclic ring selected from the group consisting of indoline, benz-(c,d)-indole, quinoxalone, quinazolone, 3-methyl-dihydro-(2,3)-benzthiazole, 3-ethyl-dihydro-(2,3)-benzthiazole, 3 - ethyl-4,5-benzodihydro-(2,3)-benzthiazole, 3,4 - dimethyl - dihydro-(2,3)thiazole, 3 - methyl-dihydro-(2,3)-benzoxazole, 1,6-dimethyl-dihydro-(1,2)-quinoline and 1 - methyl-dihydro-(1,4)-quinoline;

R is "aryl" selected from the group consisting of phenyl; 2-, 3- or 4-methylphenyl; 2-, 3- or 4-ethylphenyl; 4-isopropylphenyl; 4 - tert. - butylphenyl; 4-cyclohexylphenyl; 4-bisphenylyl; phenyl - 4,5 - tetramethylene; 2-, 3- or 4-chlorophenyl; 2,4-dichlorophenyl; 2-, 3- and 4-bromophenyl; 4-fluorophenyl; 4-trifluorophenyl; 4-acetylphenyl; 4-cyanophenyl; 4-methoxycarbonylphenyl; 4-ethoxycarbonylphenyl; 4-methylsulfonylaminophenyl; 3-methylsulfonylphenyl; 2-, 3- or 4-methoxyphenyl; 2-, 3- or 4-ethoxyphenyl; 4-isopropoxyphenyl; 4-methylmercaptophenyl; naphthyl-1; thienyl-2; furyl-2; pyridyl-2; benzoxazolyl-2; or benzthiazolyl-2;

$R_1$, $R_2$, $R_3$, $R_4$, $R_5$ and $R_6$, independently of each other, are hydrogen; alkyl, alkyloxy, alkylthio, alkylamino, alkoxycarbonyl, alkylcarbonyl, alkylcarbonyloxy, alkylcarbonylamino or dialkylamino, in which the alkyl group contains 1–5 carbon atoms; beta cyanethyl; beta chloroethyl; beta methoxyethyl; beta ethoxyethyl; beta ethoxycarbonylethyl; aryl, aryloxy, arylalkyl in which the alkyl contains 1–5 carbon atoms, arylcarbonyloxy, arylcarbonyl, arylcarbonylamino, or arylthio, in which "aryl" is as defined above; cyclohexyl; hydroxy; amidocarbonyl; nitrile; nitro; amino; sulfonyl; mercapto; fluorine; chlorine; or bromine;

$R_7$ is hydrogen or —CN;

$R_8$ is hydrogen; alkyl of 1–5 carbon atoms; beta cyanethyl; allyl; beta chloroethyl; beta methoxyethyl; beta ethoxyethyl; beta ethoxycarbonylethyl; cyclohexyl; or aryl or arylalkyl in which the alkyl group contains 1–5 carbon atoms in which "aryl" is as defined above;

$X^{(-)}$ is an anion;

$m$, $n$ and $p$ independently are the numbers 0 or 1 on the condition that if $p$ is 1, $R_8$ cannot be hydrogen;

and in which A can contain non-ionic substituents listed for $R_1$, $R_2$, $R_3$, $R_4$, $R_5$ and $R_6$ above.

2. The compound of claim 1 of the formula

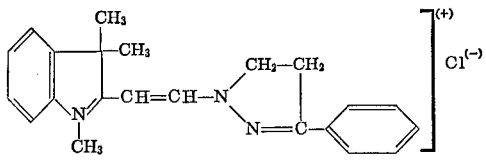

3. The compound of claim 1 of the formula

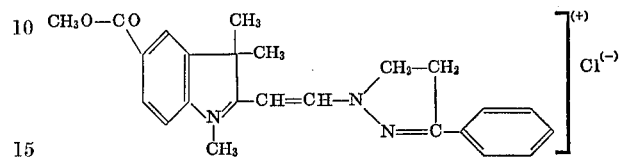

4. The compound of claim 1 of the formula

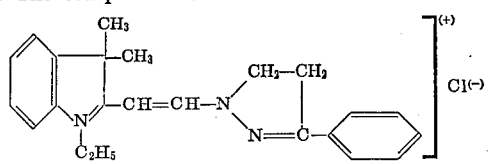

5. The compound of claim 1 of the formula

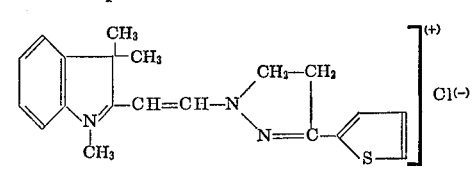

6. The compound of claim 1 of the formula

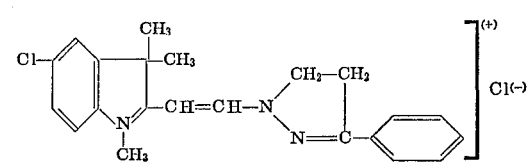

7. The dye of claim 1 in which $p$ is 1.

8. Dye of claim 1 having the formula

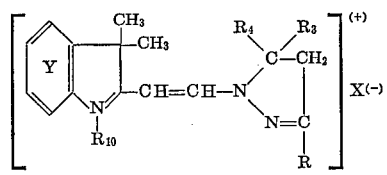

wherein $R_3$, $R_4$ and $X^{(-)}$ are as defined in claim 1;

$R_{10}$ is lower alkyl;

and in which the carbocyclic ring Y can contain the non-ionic substituents defined for $R_3$ and $R_4$.

9. Dye of the formula

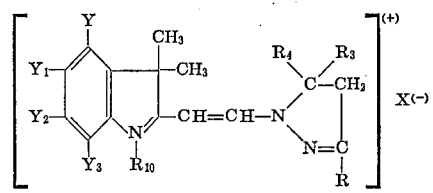

R is "aryl" selected from the group consisting of phenyl; 2-, 3- or 4-methylphenyl; 2-, 3- or 4-ethylphenyl; 4-isopropylphenyl; 4 - tert. - butylphenyl; 4-cyclohexylphenyl; 4 - bisphenylyl; phenyl-4,5-tetramethylene; 2-, 3- or 4-chlorophenyl; 2,4 - dichlorophenyl; 2-, 3- and 4-bromophenyl; 4-fluorophenyl; 4-trifluorophenyl; 4-acetylphenyl; 4-cyanophenyl; 4-methoxycarbonylphenyl; 4-ethoxycarbonylphenyl; 4-methylsulfonylaminophenyl; 3-methylsulfonylphenyl;

2-, 3- or 4-methoxyphenyl; 2-, 3- or 4-ethoxyphenyl; 4-isopropoxyphenyl; 4-methylmercaptophenyl; naphthyl-1; thienyl-2; furyl-2; pyridyl-2; benzoxazolyl-2; or benzthiazolyl-2;

$R_{10}$ is lower alkyl;

$X^{(-)}$ is an anion;

$R_3$ and $R_4$ independently of one another are hydrogen or non-ionic substituents;

Y, $Y_1$, $Y_2$ and $Y_3$ are hydrogen or one or two of Y, $Y_1$, $Y_2$ and $Y_3$ are non-ionic substituents or Y and $Y_1$, $Y_1$ and $Y_2$, or $Y_2$ and $Y_3$ taken together may form a fused benzo ring; said non-ionic substituents selected from the group consisting of alkyl, alkyloxy, alkylthio, alkylamino, alkoxycarbonyl, alkylcarbonyl, alkylcarbonyloxy, alkylcarbonylamino or dialkylamino in which the alkyl group contains 1–5 carbon atoms; beta cyanethyl; beta chloroethyl; beta methoxyethyl; beta ethoxyethyl; beta ethoxycarbonylethyl; aryl, aryloxy, arylalkyl in which the alkyl contains 1–5 carbon atoms, arylcarbonyloxy, arylcarbonyl, arylcarbonylamino, or arylthio in which "aryl" is as defined above; cyclohexyl; hydroxy; amidocarbonyl; nitrile; nitro; amino; sulfonyl; mercapto; fluorine; chlorine; and bromine.

References Cited

UNITED STATES PATENTS

| | | | |
|---|---|---|---|
| 3,551,439 | 12/1970 | Baumann et al. | 260—299 |
| 2,906,588 | 9/1959 | Brunkhorst et al. | 260—240.8 X |
| 2,961,317 | 11/1960 | Webster et al. | 260—240 E X |
| 3,013,015 | 12/1961 | Plue | 260—240 E X |
| 3,073,820 | 1/1963 | Plue | 260—240 E |

OTHER REFERENCES

Wiley et al.: Pyrazoles, Pyrazolines, Pyrazolidines, Indazoles and Condensed Rings, pp. 221–222, Interscience Publishers (1967).

JOHN D. RANDOLPH, Primary Examiner

U.S. Cl. X.R.

8—62, 177 R, 179; 260—240 E, 240.1, 244 R, 278, 279 R, 288 R, 296 R, 306.8 F, 307 D, 309.2, 310 D, 319.1, 340.6, 576